United States Patent
Zhang et al.

(10) Patent No.: US 12,304,847 B2
(45) Date of Patent: May 20, 2025

(54) MICROALGAE CULTURING POND-CONSTRUCTED WETLAND COUPLED SYSTEM AND METHOD FOR ADVANCED SEWAGE PURIFICATION

(71) Applicant: SHANDONG UNIVERSITY, Shandong (CN)

(72) Inventors: Jian Zhang, Jinan (CN); Linlan Zhuang, Jinan (CN); Mengting Li, Jinan (CN); Shuang Liang, Jinan (CN); Zhen Hu, Jinan (CN); Huijun Xie, Jinan (CN); Haiming Wu, Jinan (CN); Zizhang Guo, Jinan (CN)

(73) Assignee: SHANDONG UNIVERSITY, Jinan (CN)

(*) Notice: Subject to any disclaimer, the term of this patent is extended or adjusted under 35 U.S.C. 154(b) by 0 days.

(21) Appl. No.: 17/796,316

(22) PCT Filed: May 7, 2021

(86) PCT No.: PCT/CN2021/092143
§ 371 (c)(1),
(2) Date: Jul. 29, 2022

(87) PCT Pub. No.: WO2022/217674
PCT Pub. Date: Oct. 20, 2022

(65) Prior Publication Data
US 2024/0182337 A1    Jun. 6, 2024

(30) Foreign Application Priority Data
Apr. 13, 2021   (CN) .................... 202110396200.3

(51) Int. Cl.
*C02F 3/32*     (2023.01)
*C02F 3/30*     (2023.01)
*C02F 101/16*   (2006.01)

(52) U.S. Cl.
CPC ............... *C02F 3/327* (2013.01); *C02F 3/30* (2013.01); *C02F 3/302* (2013.01); *C02F 3/32* (2013.01);
(Continued)

(58) Field of Classification Search
CPC .. C02F 3/327; C02F 3/30; C02F 3/302; C02F 3/32; C02F 3/322; C02F 2101/16; C02F 2201/3222; Y02W 10/10
(Continued)

(56) References Cited

U.S. PATENT DOCUMENTS
2002/0079270 A1* 6/2002 Borodyanski .......... B01D 21/08
                                                              210/705

FOREIGN PATENT DOCUMENTS
CN          1887747 A         1/2007
CN          101519634 A   *   9/2009
(Continued)

OTHER PUBLICATIONS
Machine-generated English translation of CN 105198086, generated on Nov. 7, 2024.*
(Continued)

*Primary Examiner* — Fred Prince
(74) *Attorney, Agent, or Firm* — Oliff PLC

(57) ABSTRACT

A system that relates to the technical field of sewage purification includes microalgae culturing pond and constructed wetland that are connected in series. A microalgae capturing filler is arranged in the microalgae culturing pond, algae-containing water obtained from microalgae capturing filler is communicated with the constructed wetland for oxygen transfer and forming algal-bacterial mutualistic symbiosis for strengthened pollutant removal, and part of captured microalgae is introduced into an anoxic denitrification functional area away from a surface in constructed
(Continued)

wetland by flow guide pipe. Microalgae culture and sewage purification are realized in microalgae culturing pond by taking sewage as a culture medium, 80% or more of the microalgae biomasses in microalgae culturing pond are recovered with low cost, part of microalgae is introduced into the anoxic denitrification functional area away from the surface in the constructed wetland, and lytic algae cells serving as a carbon source promote denitrification in the wetland.

13 Claims, 2 Drawing Sheets

(52) U.S. Cl.
CPC .......... *C02F 3/322* (2013.01); *C02F 2101/16* (2013.01); *C02F 2201/3222* (2013.01); *Y02W 10/10* (2015.05)

(58) Field of Classification Search
USPC .............................. 210/606, 903, 602; 47/1.4
See application file for complete search history.

(56) References Cited

FOREIGN PATENT DOCUMENTS

| | | | | |
|---|---|---|---|---|
| CN | 105198086 | A | | 12/2015 |
| CN | 205473789 | U | * | 8/2016 |
| CN | 107043197 | A | | 8/2017 |
| CN | 107593562 | A | * | 1/2018 |
| CN | 206843201 | U | | 1/2018 |
| CN | 208632527 | U | * | 3/2019 |
| CN | 109761372 | A | | 5/2019 |
| CN | 110745958 | A | * | 2/2020 ................ C02F 3/30 |
| CN | 210261453 | U | | 4/2020 |
| FR | 2749840 | A1 | * | 12/1997 ......... B01D 21/0018 |
| JP | 2018-183763 | A | | 11/2018 |

OTHER PUBLICATIONS

Machine-generated English translation of CN 210261453, generated on Nov. 7, 2024.*
Machine-generated English translation of CN 101519634, generated on Nov. 7, 2024.*
Machine-generated English translation of CN 205473789, generated on Nov. 7, 2024.*
Machine-generated English translation of FR 2749840, generated on Nov. 7, 2024.*
Machine-generated English translation of CN 107593562, generated on Nov. 7, 2024.*
Machine-generated English translation of CN 208632527, generated on Nov. 7, 2024.*
Machine-generated English translation of CN 110745958, generated on Nov. 7, 2024.*
Jan. 13, 2022 International Search Report issued in International Patent Application No. PCT/CN2021/092143.
Jan. 13, 2022 Written Opinion issued in International Patent Application No. PCT/CN2021/092143.
Jan. 6, 2022 Office Action issued in Chinese Patent Application No. 202110396200.3.
Jun. 20, 2022 Office Action issued in Chinese Patent Application No. 202110396200.3.
Zhong, Fei et al., "The use of microalgal biomass as a carbon source for nitrate removal in horizontal subsurface flow constructed wetlands", Ecological Engineering, vol. 127, pp. 263-267, 2019.

* cited by examiner

MICROALGAE CULTURING POND-CONSTRUCTED WETLAND COUPLED SYSTEM AND METHOD FOR ADVANCED SEWAGE PURIFICATION

TECHNICAL FIELD

The present disclosure relates to the technical field of sewage purification, particularly to a microalgae culturing pond-constructed wetland coupled system and method for advanced sewage purification.

BACKGROUND

The background information is provided only to increase the understanding of the overall background of the present disclosure, but is not necessarily regarded as an acknowledgement or in any form suggesting that the information constitutes the prior art known to a person of ordinary skill in the art.

By 2019, the quantity of sewage discharge in China was 55465 million square meters, which calculated based on the current first-grade A discharge standard for sewage, was still equivalent to discharge of pollutants such as 1110 thousand tons of organic matters (COD), 800 thousand tons of nitrogen and 11 thousand tons of phosphorus to four types of water bodies every year, thereby greatly increasing the ecological risk of a natural water environment. Therefore, vigorous development of advanced sewage treatment and recycling technologies is an important way to relieve shortage of water resources and prevent water body pollution.

A high lipid/protein content-microalgae culture and advanced sewage purification coupling technology combining microalgae growth with removal of sewage converts pollutants such as nitrogen and phosphorus in sewage into microalgae biomasses by means of photosynthesis of microalgae, so as to realize sewage purification and conversion of pollutants to biomass resources synchronously. This technology can be applied to purifying various types of sewage such as sanitary sewage and livestock breeding wastewater, with the removal rate of nitrogen and phosphorus approximating 100%. The microalgae biomasses generated by conversion are good aquatic baits. A part of algae species with high oil content (the content is greater than 30%) has the potential to produce biodiesel. However, it is high in energy consumption and cost to efficiently separate algae from water by means of filtration, centrifugation and others, which restrains large-scale application of this technology.

A constructed wetland technology is a classic application of advanced sewage purification by a biological/ecological method, which features low operating cost, simple maintenance and ecological landscape function. A constructed wetland realizes advanced purification of sewage via multiple ways of environmental microbial conversion, plant absorption, substrate adsorption and the like. In a subsurface flow constructed wetland, bacterial communities play a main role in a removal process of carbon/nitrogen pollutants with a contribution rate exceeding 80%, which is much higher than that of plant absorption and substrate adsorption. It can be seen that the resource conversion rate of the pollutants into plant is relatively low. Owing to oxygen exudation of plant root systems and low atmospheric oxygen-enriched efficiency in the wetland, an ammonia nitrogen oxidation process of ammonia oxidizing bacteria is restrained, so that the removal rate of total nitrogen is only about 40%. Oxygenating measures such as aeration and a tidal flow are needed to efficiently remove ammonia nitrogen. However, the cost is relatively high. It is reported that a surface layer of the constructed wetland has a small amount of microalgae, with less than 3% of contribution to water quality purification and oxygenating function, which can be substantially negligible. If more microalgae can be introduced into the wetland, a new important way is provided to oxygenate the wetland. In addition, microalgae can form a complicated symbiotic relationship with the bacterial communities in various ways such as secretion of extracellular products and gas exchange, so that the water quality purifying capacity of the wetland can be further improved.

It is reported in the prior art that the microalgae culturing pond and the constructed wetland are combined to treat sewage with high nitrogen and low carbon, and the microalgae as an external carbon source flows into the constructed wetland after cultured in the microalgae culturing pond, function as carbon gathering treatment so as to improve the denitrifying capacity of the constructed wetland. However, there is still a large space for improving the denitrifying capacity of the constructed wetland in the prior art.

SUMMARY

In order to resolve the technical problem that the constructed wetland in the prior art is poor in denitrifying capacity, the present disclosure provides a microalgae culturing pond-constructed wetland coupled system for advanced sewage purification. Microalgae culture and sewage purification are realized in the microalgae culturing pond by taking sewage as a culture medium, 80% or more of microalgae biomasses in the microalgae culturing pond are recovered with a low cost, and algae-containing water containing a small amount of microalgae in the microalgae culturing pond is introduced into the constructed wetland. The algae-containing water enters the surface of the constructed wetland, and generates oxygen by means of photosynthesis, which can strengthen oxygen supply of the constructed wetland and oxidation of ammonia nitrogen. A part of recovered microalgae is introduced into the anoxic denitrification functional area away from the surface in the constructed wetland by means of a flow guide pipe, algae cells entering a deep layer of the wetland are lysed and dead due to adverse conditions, and the lytic algae cells as a carbon source promote denitrification in the wetland. In conclusion, compared with adding microalgae with influent at the surface of constructed wetland, maximal nitrogen removal is realized by the minimum microalgae dosage by our adding position.

To achieve the foregoing objective, the technical solutions of the present disclosure are as follows:

In a first aspect of the present disclosure, a microalgae culturing pond-constructed wetland coupled system for advanced sewage purification is provided. The system includes a microalgae culturing pond and a constructed wetland that are connected in series.

A microalgae capturing filler is arranged in the microalgae culturing pond, residual algae-containing water obtained after the microalgae capturing filler captures microalgae is communicated with the constructed wetland, and a part of captured microalgae is introduced into an anoxic denitrification functional area away from a surface in the constructed wetland by means of a flow guide pipe.

After the microalgae are captured by the microalgae capturing filler in the microalgae culturing pond, the algae-containing water and recovered microalgae are obtained, and the algae-containing water contains a small amount of residual algae. The algae-containing water is added into the surface of constructed wetland, and a part of microalgae as the carbon source is added into the anoxic denitrification functional area away from the surface in the constructed wetland rather than an aerobic zone in the surface layer, so that the input amount of the microalgae entering the wetland is decreased. Algae cells entering a deep layer of the wetland are lysed and dead due to adverse conditions, and the lytic algae cells as a carbon source promote denitrification in the wetland, so as to realize maximal denitrification. Furthermore, as the part of captured microalgae is added into the anoxic denitrification functional area of the constructed wetland, the remaining captured microalgae can be used as byproducts to produce feeds and baits, so that the economical efficiency of this technology is improved.

In a second aspect of the present disclosure, a method for treating sewage by utilizing the microalgae culturing pond-constructed wetland coupled system for advanced sewage purification in the first aspect is provided. The method includes:

capturing microalgae in the microalgae culturing pond after culturing the microalgae in the microalgae culturing pond for a period of time; introducing algae-containing water in the microalgae culturing pond into the constructed wetland after capturing the microalgae, and adding a part of captured microalgae as a carbon source into an anoxic denitrification functional area away from the surface in the constructed wetland; and using other microalgae to produce biomass related products.

Suspended microalgae in the microalgae culturing pond grow rapidly to absorb nitrogen and phosphorus in the wastewater, and the microalgae capturing filler arranged in the microalgae culturing pond contributes to harvesting microalgae biomasses, which did not need strictly high recovery efficiency and had low energy consumption.

The microalgae in the algae-containing water entering the constructed wetland further absorb nitrogen and phosphorus in the water in the surface layer of the constructed wetland, and can strengthen oxygen supply of the constructed wetland. Algae and bacteria formed biofilm strengthen the pollutant removal capacity under the symbiotic condition. Microalgae cells in the anoxic denitrification functional area rupture to provide a denitrification carbon source.

Specific implementations of the present disclosure bring the following beneficial effects:

According to the present disclosure, microalgae culture and sewage purification are realized in the microalgae culturing pond by taking sewage as a culture medium, 80% or more of microalgae biomasses in the microalgae culturing pond are recovered with a low cost, and residual algae-containing water in the microalgae culturing pond is introduced into the constructed wetland. A part of recovered microalgae is introduced into the anoxic denitrification functional area away from the surface in the constructed wetland by means of a flow guide pipe, algae cells entering a deep layer of the wetland are lysed and dead due to adverse conditions, and the lytic algae cells as a carbon source promote denitrification in the wetland.

Moreover, the algae-containing water can further strengthen oxygen supply of the constructed wetland, and as the part of captured microalgae is only added into the anoxic denitrification functional area of the constructed wetland, more microalgae biomasses in the microalgae culturing pond are harvested, and maximal denitrification of the constructed wetland and maximal microalgae by-product production are realized.

According to the present disclosure, suspended microalgae in the microalgae culturing pond grow rapidly to absorb nitrogen and phosphorus in the wastewater, and the microalgae capturing filler arranged in the microalgae culturing pond contributes to harvesting microalgae biomasses.

According to the present disclosure, recycling of a part of nutritional substances in the sewage is realized, the oxygenating problem and the problem of shortage of carbon source of the constructed wetland are resolved in an energy consumption free manner, and the removal rate of total nitrogen and total phosphorus is improved.

BRIEF DESCRIPTION OF THE DRAWINGS

The accompanying drawings constituting a part of the present disclosure are used to provide a further understanding of the present disclosure. The exemplary embodiments of the present disclosure and descriptions thereof are used to explain the present disclosure, and do not constitute an improper limitation of the present disclosure.

DETAILED DESCRIPTION

It should be noted that, the following detailed descriptions are exemplary, and are intended to provide a further description to the present disclosure. Unless otherwise indicated, all technical terms and scientific terms used in the present disclosure have the same meaning as commonly understood by a person of ordinary skill in the art to which the present disclosure belongs.

It should be noted that terms used herein are only for describing specific implementations and are not intended to limit exemplary implementations according to the present disclosure. As used herein, the singular form is intended to include the plural form, unless the context clearly indicates otherwise. In addition, it should further be understood that terms "comprise" and/or "include" used in this specification indicate that there are features, steps, operations, devices, components, and/or combinations thereof.

Figure 1:
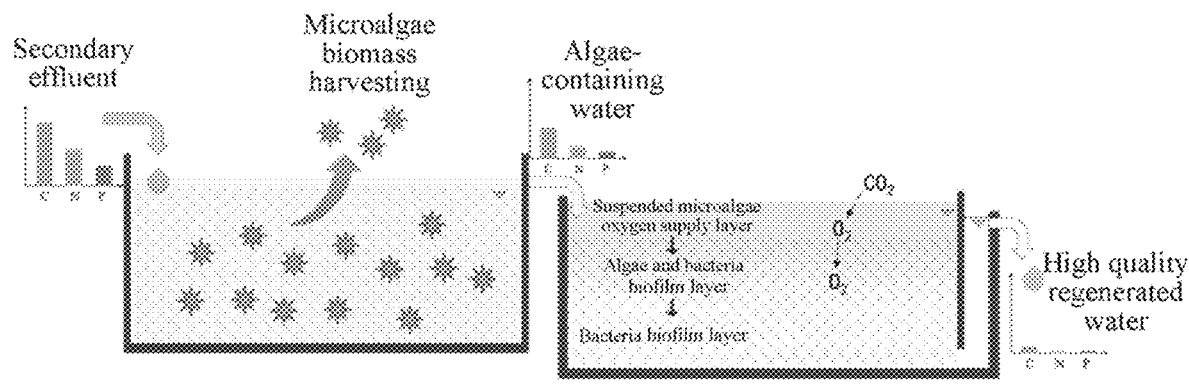
FIG. 1 is a mechanism diagram of a microalgae culturing pond-constructed wetland coupled system.

In an implementation, as shown in FIG. 1, a microalgae culturing pond-constructed wetland coupled system for advanced sewage purification is provided. The system includes a microalgae culturing pond and a constructed wetland that are connected in series.

A microalgae capturing filler is arranged in the microalgae culturing pond, residual algae-containing water obtained after the microalgae capturing filler captures microalgae is communicated with the constructed wetland, and a part of captured microalgae is introduced into an anoxic denitrification functional area away from a surface in the constructed wetland by means of a flow guide pipe.

In one or more implementations, the microalgae capturing filler is selected from a flannel and a superfine fiber, preferably the superfine fiber. The microalgae capturing filler is used to capture microalgae growing in the microalgae culturing pond. The flannel or the superfine fiber has a three-dimensional net structure, which strengthens collision and interception effects to microalgae.

In one or more implementations, an effluent mode of the microalgae culturing pond is in form of overflow weir.

In one or more implementations, LED lamps are arranged around and above the microalgae culturing pond as supplementary light sources so as to provide sufficient light sources to growth of microalgae.

In one or more implementations, an aeration disc is arranged at the bottom of the microalgae culturing pond so as to provide enough air to growth of microalgae.

In one or more implementations, the constructed wetland is of a concrete structure, with anti-seepage treatment at the bottom.

In one or more implementations, the filler of the constructed wetland is quartz sand with a particle size of 4-6 cm, so as to reduce substrate clogging by microalgae, and a depth of the filler is set to be 0.6-0.8 m.

Tail water of the microalgae culturing pond is rich in dissolved oxygen and is taken as an influent of the constructed wetland to strengthen the oxidation removal effect of ammonia nitrogen. Microalgae are added into the anoxic denitrification functional area of the constructed wetland and can be taken as a releasing organic carbon source to improve denitrification of nitrate nitrogen. The adding amount of microalgae shall be determined according to organic carbon amount needed by denitrification and shall not be too large.

If the microalgae substances are not captured in the microalgae culturing pond but the algae-containing water and all microalgae therein are directly introduced into the constructed wetland, substrates in the wetland can intercept the microalgae layer by layer, and the microalgae as suspended solids may cause clogging of the wetland. Furthermore, it is considered that the released organic carbon source after microalgae cells are lysed may be mineralized by common heterotrophic bacteria rather than being used in a denitrification process by denitrifying bacteria. Therefore, the inventor provides a solution that a part of microalgae is directly injected into the denitrification functional area in an anoxic environment by means of the flow guide pipe rather than the aerobic zone in the surface layer, so as to reduce the input amount of microalgae entering the wetland, realize maximal denitrification and harvest more microalgae biomasses as well.

In an implementation of the present disclosure, a method for treating sewage by utilizing the microalgae culturing pond-constructed wetland coupled system for advanced sewage purification is provided. The method includes:

microalgae in the microalgae culturing pond was captured after the microalgae in the microalgae culturing pond was cultured for a period of time; algae-containing water in the microalgae culturing pond was introduced into the constructed wetland after the microalgae were captured, and a part of captured microalgae as a carbon source was added into an anoxic denitrification functional area away from the surface in the constructed wetland; and other microalgae were used to produce biomass related products.

In one or more implementations, a microalgae culture-algae and water separation two-stage mode or a microalgae suspension-adhesion mixed culture mode was used in the microalgae culturing pond, which recovered 80% or more of microalgae biomasses with a low cost while purifying sewage.

In the microalgae culture-algae and water separation two-stage mode, a suspended culture mode was used for microalgae culture, and a capturing material intercepting mode might be used for algae and water separation. In the microalgae suspension-adhesion mixed culture mode, an adhesion material was the capturing material.

In one or more implementations, a retention time of the sewage in the microalgae culturing pond was 3-5 days, preferably 4 days, and the retention time of the sewage in the constructed wetland was 1-3 days, preferably 2 days.

Suspended microalgae in the microalgae culturing pond grew rapidly to absorb nitrogen and phosphorus in the wastewater, and the microalgae capturing filler arranged in the microalgae culturing pond contributed to harvesting microalgae biomasses.

The microalgae in the algae-containing water entering the constructed wetland further absorbed nitrogen and phosphorus in the water in the surface layer of the constructed wetland, and might strengthen oxygen supply of the constructed wetland. Algae and bacteria in biological membrane layers of algae and bacteria strengthened the pollutant removal capacity under the symbiotic condition. Microalgae cells in the anoxic denitrification functional area ruptured to provide a denitrification carbon source.

In the example of the present disclosure, the subsequent strengthened oxygenating and carbon compensating degrees and positions of the constructed wetland might be adjusted reasonably according to change in load of pollutants of the constructed wetland due to change in water quality in the microalgae culturing pond.

From the point of view of total nitrogen removal, in consideration of selective utilization of nitrogen in different forms by microalgae (under common circumstances, ammonia nitrogen was preferred rather than nitrate nitrogen), when the retention time of sewage in the microalgae culturing pond is long, ammonia nitrogen was utilized first, so that the subsequent ammonia nitrogen load of the constructed wetland was reduced correspondingly, and oxygenating measures for ammonia nitrogen might be loosened properly. In consideration of an extreme condition, namely, ammonia nitrogen in the microalgae culturing pond was completely absorbed by microalgae, the constructed wetland only needed to play a role of nitrogen removal by denitrification without an ammoxidation function, and at the moment, it should give proper consideration to reduction of the content of dissolved oxygen of the algae-containing water (namely, the influent of the constructed wetland) in the microalgae culturing pond. The method that reduced the content of dissolved oxygen might remove dissolved oxygen in water by means of pre-treatment such as light prevention and reduction disposal by chemical agents, so that the wetland entered the anoxic environment as soon as possible so as to play the denitrification function.

Figure 2:
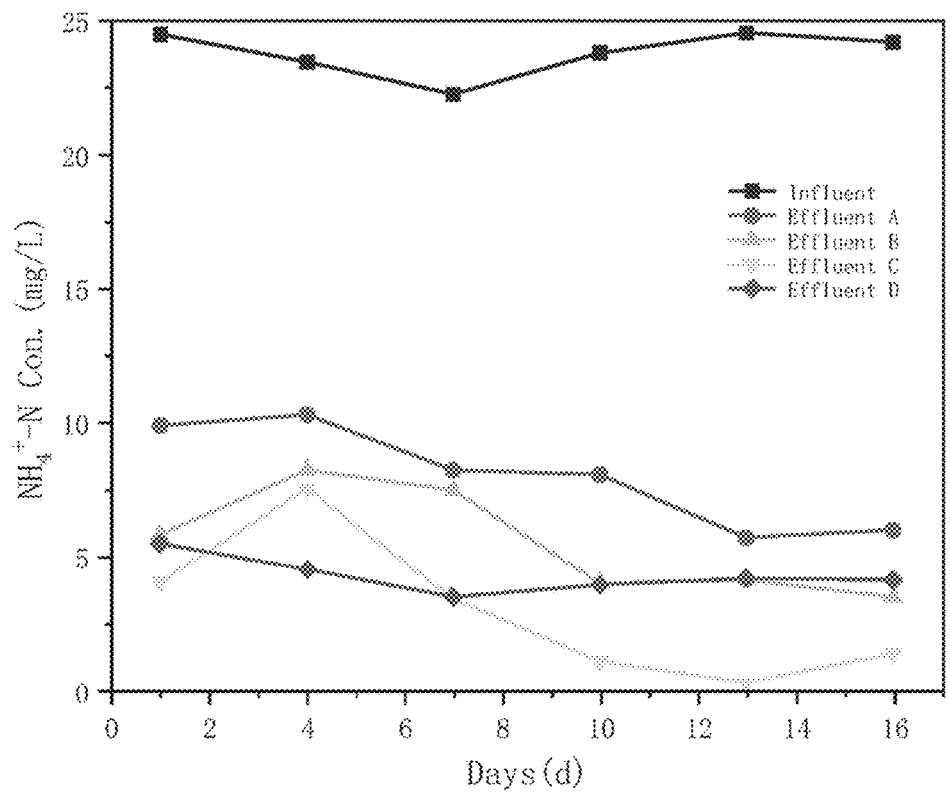
FIG. 2 is an effect diagram of microalgae removing ammonia nitrogen in a constructed wetland in an example of the present disclosure.

A corresponding lab test system was constructed based on the design of the coupled system of the present disclosure. First, the strengthening effect of microalgae oxygenation to ammonia nitrogen removal of the constructed wetland was tested by constructing the constructed wetland:

A reactor of the constructed wetland was constructed in a lab, the height of the surface in the wetland was elevated by 5 cm from the substrate surface, 5 ml of a concentrated algae solution cleaned by a phosphate buffer solution was added into the surface every two days, and the number of microalgae in the concentrated algae solution was $10^7$ cell/mL. A distributed influent of the wetland was a simulated secondary effluent; the reactor was made of organic glass, the reactor was cylindrical, the diameter thereof was 15 cm, and the outer surface thereof was wrapped by a tinfoil; and quartz sand with different particle sizes was taken as a substrate filler of the wetland, and the height of the filler was set to be 45 cm. After the reactor operated stably, a water quality index test lasting 16 days was performed. It could be found that a small amount of microalgae was added, which could play an oxygenating role to the constructed wetland and had an obvious promoting effect to remove ammonia nitrogen. The promoting effect to remove ammonia nitrogen was as shown in FIG. 2. In the figure, there were 5 groups of data. The uppermost group of data was ammonia nitrogen concentrations of the influents of four groups of reactors, and the four strips below were ammonia nitrogen concentrations of the effluents of the four groups of reactors, where the group A was a control group without microalgae, the groups B-D were groups with microalgae, and the ammonia nitrogen of the effluents of the groups B-D were obviously lower than that of the group A.

It could be found that a small amount of algae cells was added, which could play an oxygenating role to the wastewater in the constructed wetland and promote removal of ammonia nitrogen.

Figure 3:
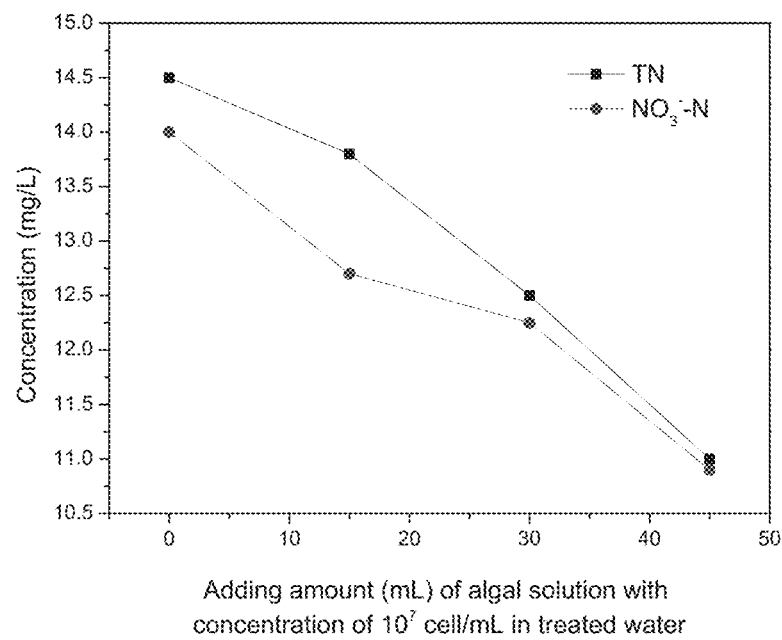
FIG. 3 is an effect diagram of microalgae promoting denitrification as a carbon source in a constructed wetland in an example of the present disclosure.

The promoting effect of the lysed algae cells as the carbon source to denitrification of the constructed wetland was tested by constructing the constructed wetland:

In order to prove the feasibility of the microalgae as the carbon source to promote denitrification, a constructed wetland experiment was conducted in the lab. The constructed wetland was simulated by a conical flask, and biofilm adhesion was performed on a quartz sand substrate with the particle size of 4-6 mm with anaerobic sludge taken from a water station in Qingdao campus of Shandong University. The substrate was put in a 1000 ml conical flask 5 days after biofilm culturing, 350 ml of 14 mg/L distributed water containing nitrate nitrogen was added, the microalgae were added with the adding amount of 45 mL/350 mL and the algae density of $10^7$ cell/mL, the quantity of microalgae in the conical flask was decreased from $10^6$ cell/mL to $10^5$ cell/mL after it was subjected to lucifugal vibration 24 h, and the content determination result of nitrate nitrogen and total nitrogen was as shown in FIG. 3.

The result showed that the removal rate of nitrate nitrogen and total nitrogen was increased with rise of the adding amount of the microalgae, showing an obvious positive correlation trend. It could be seen that the microalgae as the carbon source played a quite obvious role in promoting denitrification in the constructed wetland.

The foregoing descriptions are merely exemplary embodiments of the present disclosure, but not intended to limit the present disclosure. A person skilled in the art may make various alterations and variations to the present disclosure. Any modification, equivalent replacement, or improvement made within the spirit and principle of the present disclosure shall fall within the protection scope of the present disclosure.

What is claimed is:

1. A microalgae culturing pond constructed wetland coupled system for advanced sewage purification, comprising:
    a microalgae culturing pond and a constructed wetland connected in series;
    a microalgae capturing filler arranged in the microalgae culturing pond, the microalgae capturing filler configured to recover more than 80% of the microalgae from the microalgae culturing pond;
    a flow channel connecting the microalgae culturing pond and the constructed wetland, the flow channel configured to introduce algae-containing water, obtained after the microalgae capturing filler captures microalgae, into the constructed wetland; and
    a flow guide pipe configured to direct a portion of the microalgae recovered into an anoxic denitrification area below liquid surface in the constructed wetland.

2. The microalgae culturing pond constructed wetland coupled system for advanced sewage purification of claim 1, wherein the microalgae capturing filler is selected from the group consisting of flannel and microfiber.

3. The microalgae culturing pond constructed wetland coupled system for advanced sewage purification of claim 2, wherein the microalgae capturing filler is selected from microfiber.

4. The microalgae culturing pond constructed wetland coupled system for advanced sewage purification of claim 1, wherein the microalgae culturing pond discharges water through an overflow weir.

5. The microalgae culturing pond constructed wetland coupled system for advanced sewage purification of claim 1, wherein LED lights are provided around and above the microalgae culturing pond as supplementary light sources.

6. The microalgae culturing pond constructed wetland coupled system for advanced sewage purification of claim 1, wherein an aeration disc is arranged at the bottom of the microalgae culturing pond.

7. The microalgae culturing pond constructed wetland coupled system for advanced sewage purification of claim 1, wherein the constructed wetland is made of concrete and the bottom undergoes anti-seepage treatment.

8. The microalgae culturing pond constructed wetland coupled system for advanced sewage purification of claim 1, wherein a filler is arranged inside the constructed wetland, the filler being quartz sand with a particle size of 4-6 cm, and a depth of the filler is set to 0.6-0.8 m.

9. A method for advanced sewage purification using the microalgae culturing pond-constructed wetland coupled system of claim 1, comprising:
    cultivating microalgae in a microalgae culturing pond using sewage as a culture medium;
    capturing the microalgae from the microalgae culturing pond using a microalgae capturing filler;
    introducing algae-containing water, obtained after capturing the microalgae, into a constructed wetland;
    introducing a portion of the microalgae captured into an anoxic denitrification area below liquid surface of the constructed wetland; and
    collecting the remaining microalgae captured for production of biomass-related products.

10. The method of claim 9, wherein cultivating microalgae in the microalgae culturing pond uses a two-stage microalgae cultivation-algae water separation process.

11. The method of claim 9, wherein cultivating microalgae in the microalgae culturing pond uses a mixed suspension-adhesion microalgae cultivation process.

12. The method of claim 9, further comprising controlling a retention time of the sewage in the microalgae culturing pond to be 3-5 days, and a retention time of the algae-containing water in the constructed wetland to be 1-3 days.

13. The method of claim 12, wherein the retention time of the sewage in the microalgae culturing pond is 4 days, and the retention time of the algae-containing water in the constructed wetland is 2 days.

* * * * *